United States Patent [19]

Brynsvold et al.

[11] Patent Number: 4,882,514

[45] Date of Patent: Nov. 21, 1989

[54] SUBMERSIBLE SODIUM PUMP

[75] Inventors: Glen V. Brynsvold, San Jose; John T. Lopez, Santa Clara; Eugene E. Olich, Aptos; Calvin W. West, Livermore, all of Calif.

[73] Assignee: General Electric Company, San Jose, Calif.

[21] Appl. No.: 203,179

[22] Filed: Jun. 7, 1988

[51] Int. Cl.⁴ .................. H02K 44/06; H01F 27/28
[52] U.S. Cl. ................................ 310/208; 310/11; 310/254
[58] Field of Search .............. 310/11, 208, 216, 217, 310/254, 271; 336/186, 187, 223, 232

[56] References Cited

U.S. PATENT DOCUMENTS

| | | | |
|---|---|---|---|
| 2,702,004 | 2/1955 | Blake et al. | 310/11 |
| 2,949,593 | 8/1960 | Staley et al. | 336/223 |
| 3,292,025 | 12/1966 | Victor | 310/208 |
| 3,452,230 | 6/1969 | Pearson | 310/208 |
| 4,761,628 | 8/1988 | Nishi et al. | 336/223 |

FOREIGN PATENT DOCUMENTS

| | | | |
|---|---|---|---|
| 2545293 | 11/1984 | France | 310/12 |
| 247532 | 3/1947 | Switzerland | 336/187 |
| 580585 | 9/1946 | United Kingdom | 336/187 |
| 723570 | 2/1955 | United Kingdom | 310/11 |

OTHER PUBLICATIONS

Monroe, "Developments in Circular Core Transformers", Electrical Engineer, Apr. 1970, pp. 28–31.

Primary Examiner—Patrick R. Salce
Assistant Examiner—D. L. Rebsch
Attorney, Agent, or Firm—Robert R. Schroeder

[57] ABSTRACT

An electromagnetic submerged pump has an outer cylindrical stator with an inner cylindrical conductive core for the submerged pumping of sodium in the cylindrical interstitial volume defined between the stator and core. The cylindrical interstitial volume is typically vertically oriented, and defines an inlet at the bottom and an outlet at the top. The outer stator generates upwardly conveyed toroidal magnetic fields, which fields convey preferably from the bottom of the pump to the top of the pump liquid sodium in the cold leg of a sodium cooled nuclear reactor. The outer cylindrical stator has a vertically disposed duct surrounded by alternately stacked layers of coil units and laminates.

7 Claims, 7 Drawing Sheets

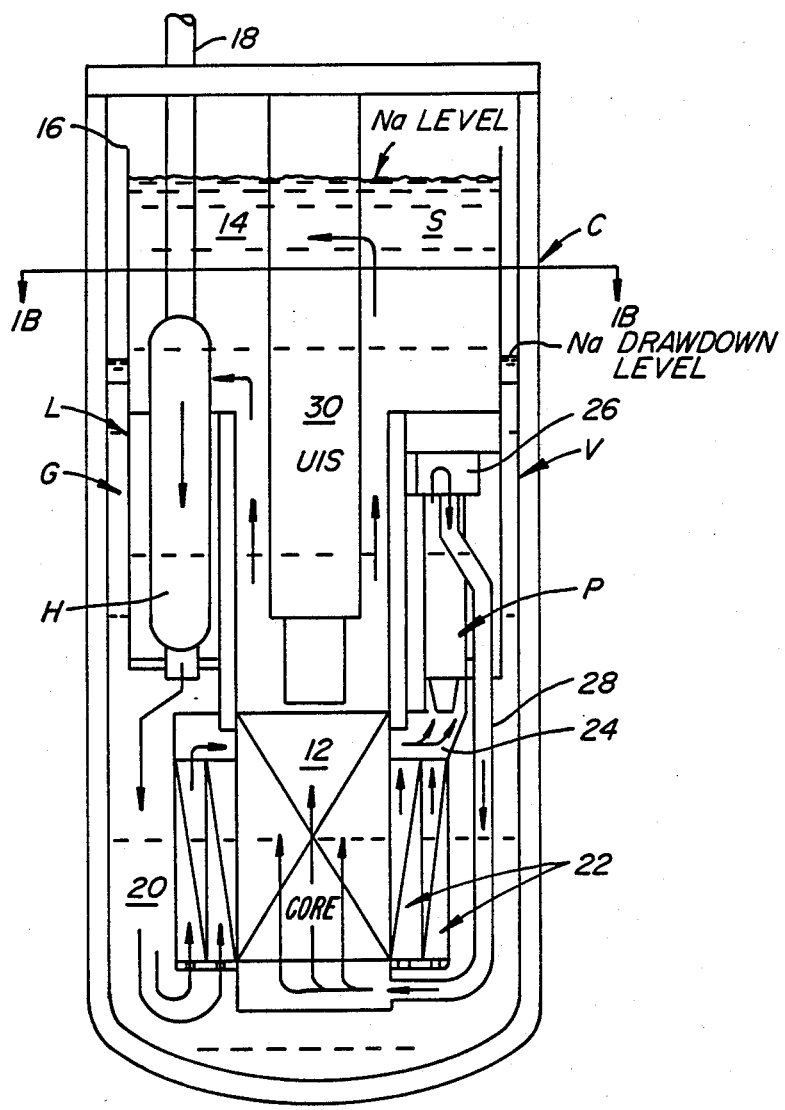
*FIG._IA.* (PRIOR ART)

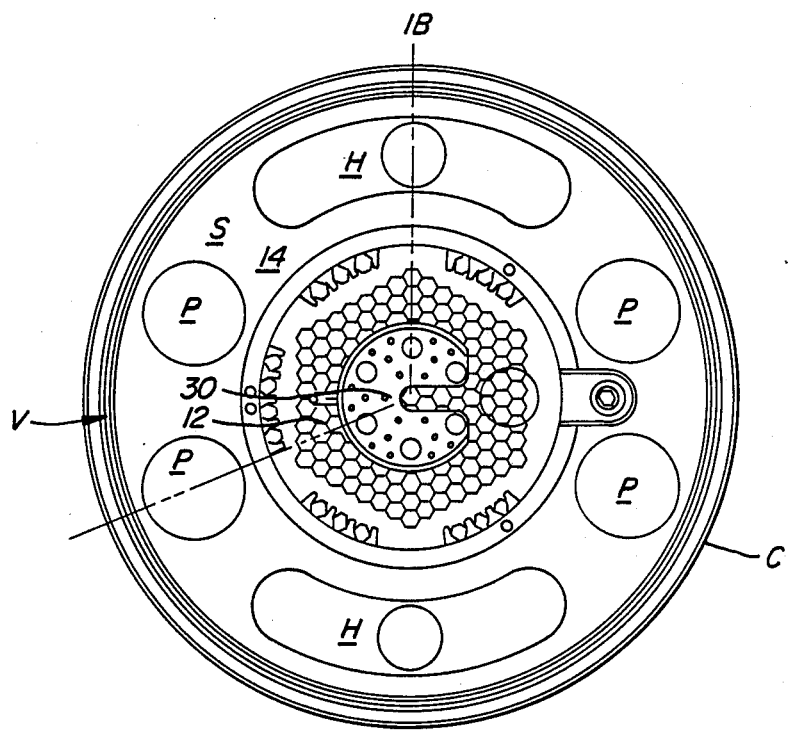
FIG._1B.  (PRIOR ART)

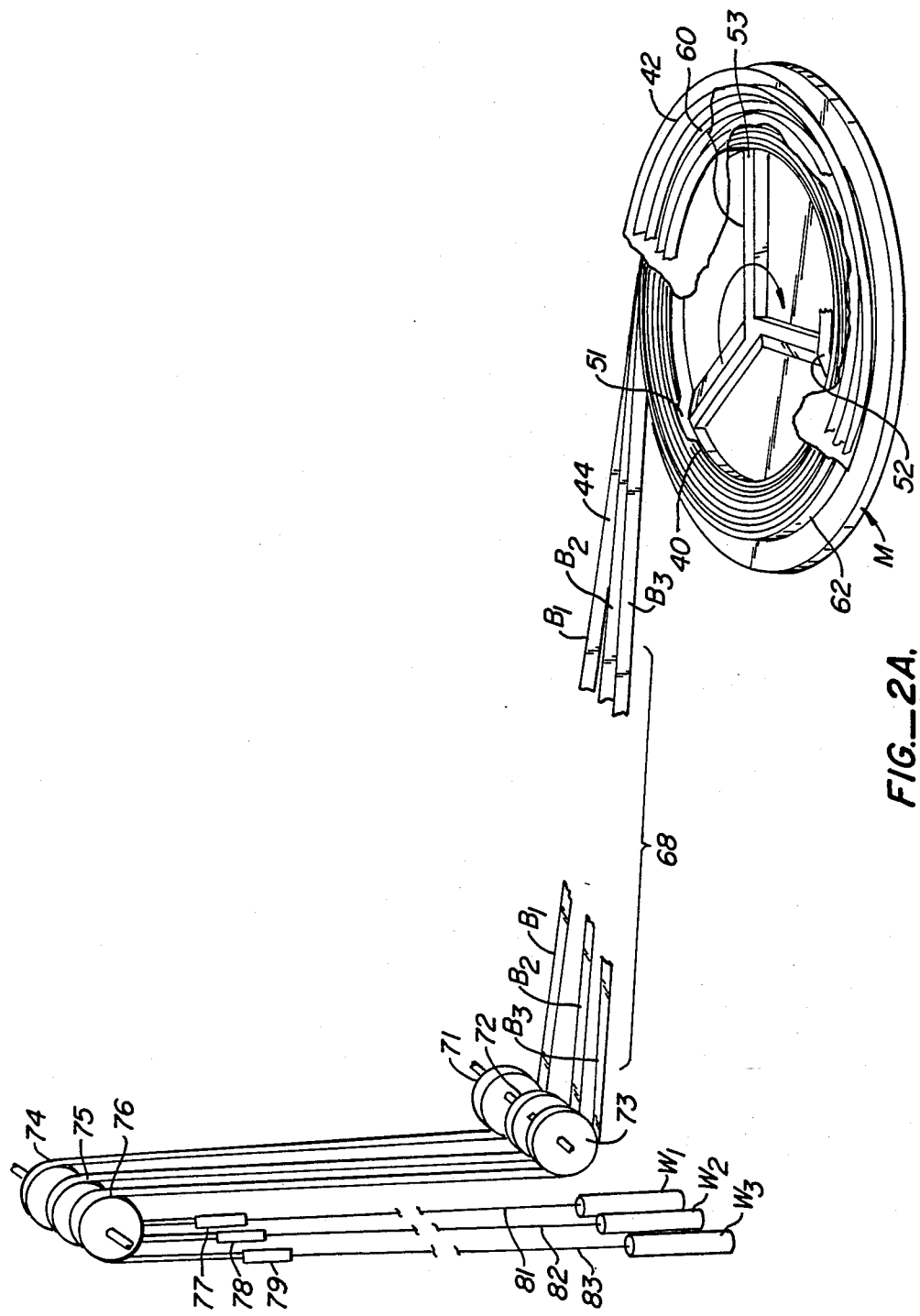
FIG._2A.

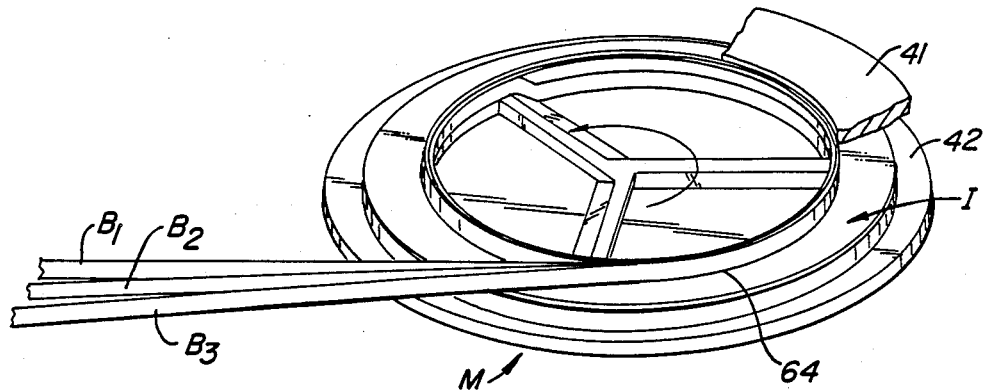
FIG._2B.
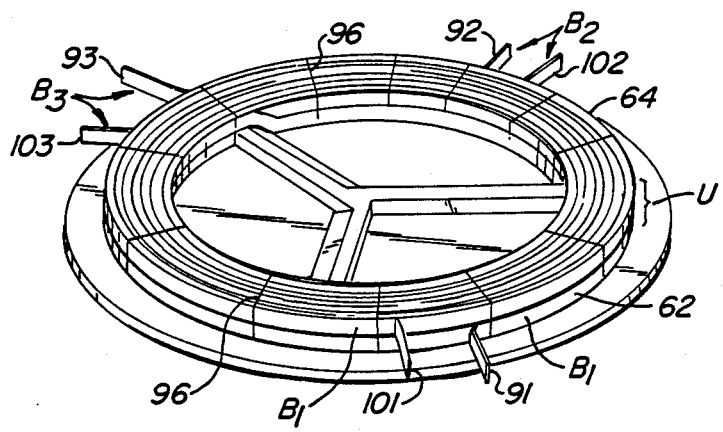
FIG._2C.
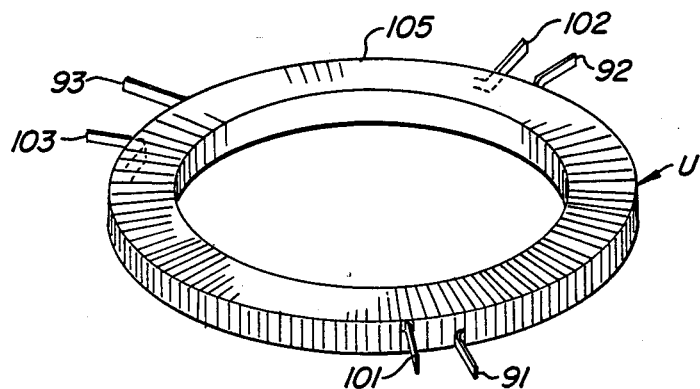
FIG._2D.

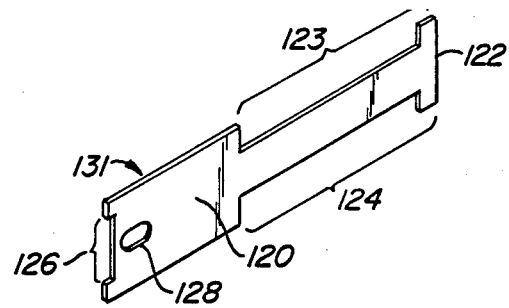
FIG._3A.
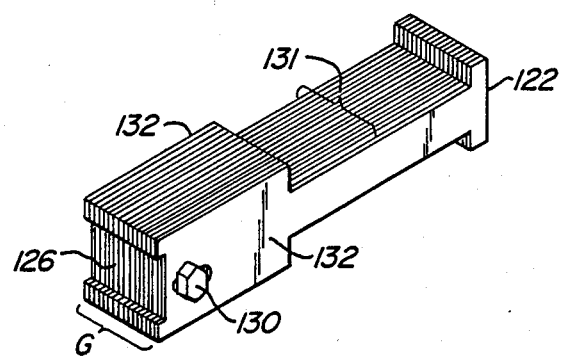
FIG._3B.
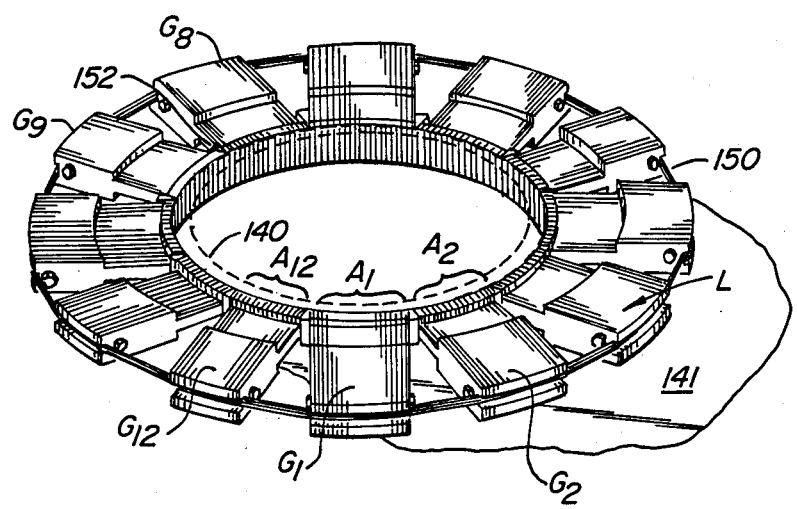
FIG._3C.

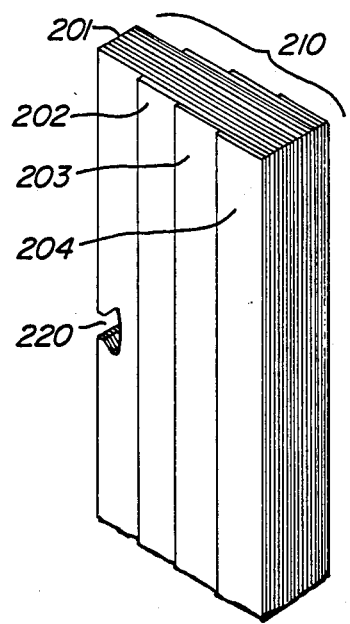
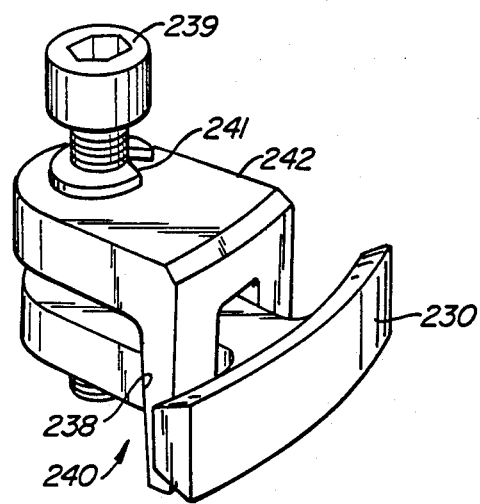
FIG._4A.  FIG._4C.
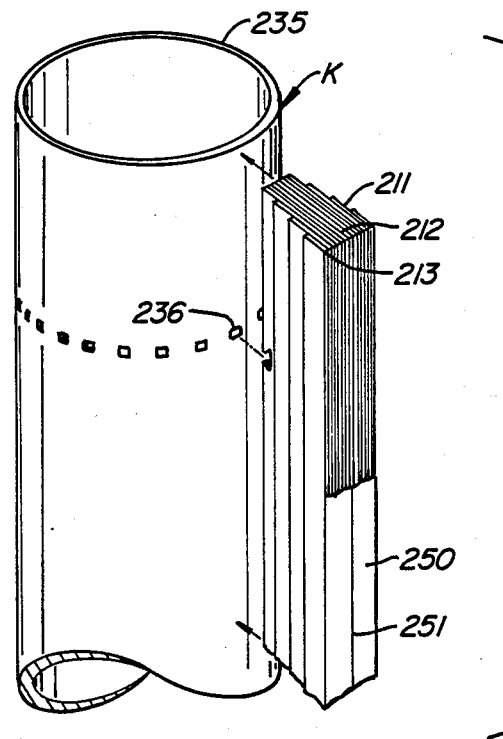
FIG._4B.

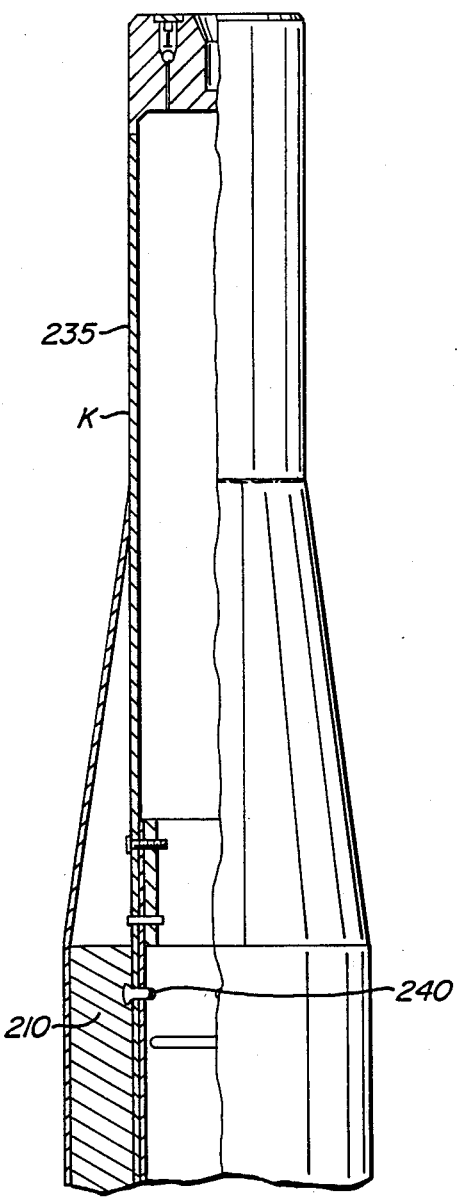
FIG._4D.
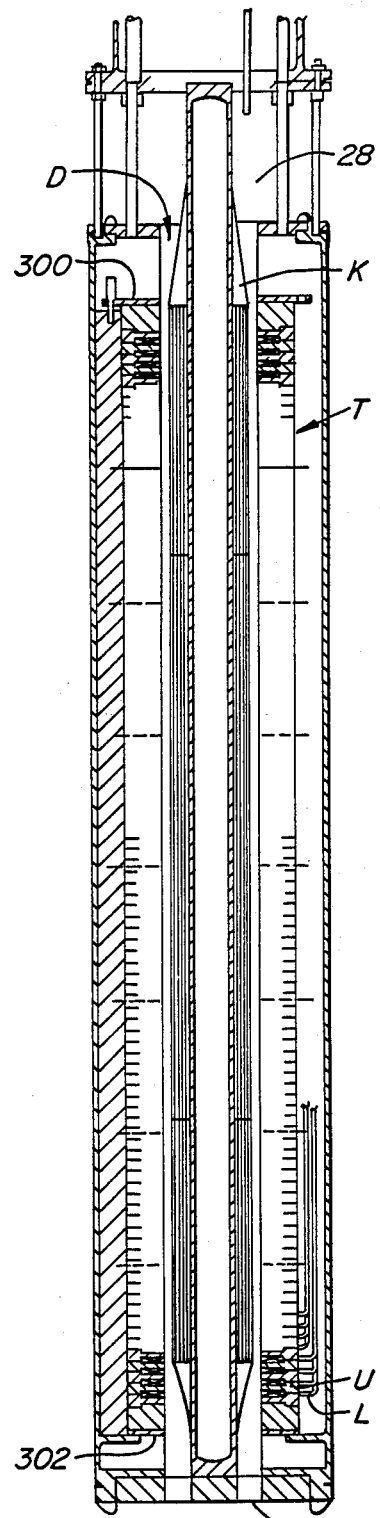
FIG._5.

SUBMERSIBLE SODIUM PUMP

The U.S. Government has rights in this invention pursuant to Contract No. DE-AC03-85NE37937 awarded by the U.S Department of Energy.

This invention relates to sodium cooled nuclear reactors. More particularly, a submerged pump for pumping sodium for preferred use of sodium cooled reactors and heat exchangers is set forth.

SUMMARY OF THE PRIOR ART

Sodium cooled nuclear rectors are known. Such reactors include a primary continuously circulating loop of liquid sodium which is sequentially pumped through a reactor core to and from an intermediate heat exchanger. The reactors also include a secondary sodium loop. This loop obtains heat energy at the intermediate heat exchanger in the reactor and transmits heat energy to a steam generator for the generation of power.

The cycle of sodium through a sodium primary loop or a secondary loop typically divides into a "hot leg" and a "cold leg." Taking the case of the primary loop in a sodium cooled reactor, the so-called "hot leg" of the sodium cycle begins at the reactor core and continues until heat is extracted at an intermediate heat exchanger. The cold leg begins at the outlet of the intermediate heat exchanger and includes passage through the pump of this invention and ends at the reactor core inlet. The cycle of the primary loop sodium interior of the reactor endlessly repeats in circulation through the loop.

It will be appreciated that the "hot leg" and "cold leg" terms are relative. Typically, the cold leg of each loop is a temperature in excess of 600° F.; the hot leg is even more extreme —temperatures in the range of 1200° F. are common.

It has been proposed to have liquid sodium pumps operated by conveyed magnetic fields. Typically, in such pumps the stator is cylindrical, oriented vertically and defines a vertical cylindrical central duct. The core of the pump is likewise cylindrical and held in place to the vertical central duct of the stator. Consequently, a cylindrical interstitial pumping volume is defined between the central core and stator. It is through this cylindrical interstitial pumping volume that pumping of the sodium occurs. typically from the bottom of the pump to the top of the pump.

The pump has no moving parts. The only "movement" is that of magnetic fields. The magnetic fields are sequentially conveyed from the inlet of the pump (typically at the bottom) to the outlet of the pump (typically at the top).

The magnetic fields are toroidal north-south fields. The field have a first side conducted in the stator and a second side conducted in the central core. The toroidal magnetic fields cross the cylindrical interstitial pumping volumes at the top of the field and the bottom of the field at a conductive gap. It is the interaction of the magnetic field with the liquid sodium in this gap that produces the required pumping action.

The conveyed magnetic field at the pump gap induces eddy currents in the sodium. The eddy currents in the sodium in turn couple the sodium to the conveyed magnetic field of the pump. Ignoring friction losses or "slippage" at the magnetic interface, sodium is conveyed through the pump from inlet to outlet in the direction of the moving magnetic field passing through the pumps from inlet to outlet.

Pumps in sodium cooled reactors are difficult to remove and service. Consequently, such pumps must be manufactured with long life expectancies. These long life expectancies require a pump design that does not either vibrate to induce wear between the pump parts or alternately overheat and deteriorate prematurely. For example, the windings which power such pumps inevitably generate heat by electrical resistance heating. This heat must be removed to maintain the windings at a temperature sufficiently cool to ensure long life of the coils.

It is heretofore been proposed to cool such pumps with gas. This gas cooling has at least two difficulties.

First, much auxiliary equipment is required for cooling.

Second, recovery of the heat energy generated in the resistance heating is not readily possible: typically, such energy of resistance heating of the coils is discarded.

SUMMARY OF THE INVENTION

An electromagnetic submerged pump is disclosed having an outer cylindrical stator with an inner cylindrical conductive core for the submerged pumping of sodium in the cylindrical interstitial volume defined between the stator and core. The cylindrical interstitial volume is typically vertically oriented an defines an inlet at the bottom and an outlet at the top. The outer stator generates upwardly conveyed toroidal magneic fields which fields convey from the bottom of the pump to the top of the pump liquid sodium in the cold leg of a sodium cooled nuclear reactor. The outer cylindrical stator has a vertically disposed duct surrounded by alternately stacked layers of coil units and laminates. A coil unit and special technique for the winding of coil units are disclosed. Upper and lower coil halves of spirally wound common copper bus are joined in series at the center. These upper and lower coil halves are connected as discrete coil units on the coil unit exterior for forming complementary magnetic fields between the coil halves. These coil units, each with their upper and lower halves, are provided with parallel connection of sequential coil units in groups of four units to each phase of a three phase, 15 Hertz 700 volt RMS power supply. A magnetic field conducting laminate construction is disclosed for sandwiching each coil unit within the outer stator. The laminate construction also maintains rigid heat transferring contact with the central duct in the pump stator to conduct resistance heating away from the coils. Additionally this rigid contact of the laminates to the duct prevents pump wear due to pumping reaction and resultant vibration of the coil unit and laminate layers of the stator. The laminate construction includes an endless arch of hoop tensioned laminates maintained in intimate contact with the stator central duct by a surrounding and peripheral hoop tension wire preferably fabricated of molybdenum. Due to differential thermal expansion in which the individual laminates are radially compressed to the central duct by the elastic hoop tension forces in the wire, firm contact with the central duct is maintained during pump operation. A laminate construction of the cylindrical inner magnetic conductive portion of the core is set forth. A total pump construction then can either be placed downstream of the intermediate heat exchanger in a sodium reactor or in the cold leg of a sodium/water steam generator within a sodium cooled plant.

OTHER OBJECTS, FEATURES AND ADVANTAGES

It is an object of this invention to disclose a coil unit for use in the stator of a sodium pump. According to this aspect of the invention, a bendable elongate copper bus strip is provided having a major planar surface with two spaced apart side edges defining an elongate strip of constant width. The bus strip has a linear length equal to the total spiral length of the coil element. At least one such length of copper bus strip is bent intermediate its ends in the plane of the major planar surface of the bus to form an "S" transition between an upper spiral wound coil half and a lower spiral wound coil half. The "S" transition extends between the upper spiral wound coil half and the lower spiral wound coil half at the center inside of the coil unit. The direction of the spiral winds to and from the "S" transition is magnetically complementary. That is to say, electricity passing through the spiral winds of each coil half in accordance with Lenz's Law produces complementary and reinforcing magnetic fields.

An advantage of the disclosed coil unit is that electric connection is simplified. The ends of each bus strip forming a continuous coil are disposed on the outside of each coil unit. Thus, the required electric connection can be made from the outside of the coil unit. Interior wiring in closed in areas is avoided.

A further advantage of the coil unit is that the spirally wound coil unit disclosed can consist of more than one spirally wound bus strip. Preferably three spirally wound bus strips, all ultimately connected in parallel, are used for one coil unit. These bus strips when connected in parallel enable a group of low voltage coils to be utilized for the pumping of sodium in place of and instead of a single high voltage coil. Resistance heat of the coil unit bus strip is correspondingly reduced.

It is an object of this invention to disclose a process for winding the coil unit. According to this aspect of the invention, three bus strips are provided. The bus strips have a major planar surface between the two side edges and are of constant width. Each strip in linear length is as long as the coil element in spiral wound length. The bus strips are fabricated from a conductor, preferably pure copper. These bus strips are first bent in the major plane of the bus strip to an "S" configuration at the middle of the linear length of the bus strip so as to make a transition between a lower spiral wind and an upper spiral wind of the ultimately produce coil unit. Thereafter, each bus is fastened at the "S" configuration in the middle of the linear length of the bus strip to a coil winding mandrel. Each of the three bus strip coil elements is fastened at their bend to the mandrel at 120° intervals. Thereafter, that half of the bus to be formed into the lower wind is placed under tension and strung away from the mandrel along a tension path. The opposite half of the bus that will form the upper wind is randomly coiled and stored on top of the mandrel. Once storage of the upper coil length has occurred, tight winding of the lower spiral coil then proceeds with half of the bus strip being drawn from the tension path to the spiral to produce a tight spiral wind. Each bus strip winds between the other two bus strips in three overlapping and outwardly spiraling layers. The ends of the bus strips terminate winding at 120° intervals on the outside of the coil to form first connections to each coil element of a coil unit. Once the lower spiral wind of the coil unit is complete, a layer of insulation is placed over the lower spirally wound coil half to insulate it from voltage on distal portion of the coil unit on the upward spiral wound coil half. The mandrel is then reconfigured for winding of the upper layer. The stored bus for the upper coil is unraveled from its storage point on top of the mandrel and placed under tension extending away from the winding mandrel along the tension path. Thereafter, tight spiral winding of the upper coil proceeds, this time with the mandrel rotating in the opposite direction to gather the second half of each coil element from the tension path. The direction of mandrel rotation is reversed so that the direction of electron rotation in each coil half produces complementary magnetic field in both coil halves. The ends of the bus are terminated as before at preferred 120° intervals on the outside of the coil to define the second connection for each coil element to the exterior of the coil. Thereafter, the coil is temporarily bound with holding ties, wound with final insulation and finally removed from the mandrel as a coil unit for use in the coil pump construction.

An advantage of the coil unit is that the three bus coil construction leaves the process as a unitary element. It can thereafter be received in a stack about a central pump duct. There is no need for winding each coil unit about the duct individually.

A further advantage of the coil unit is that the ends of the bus on the exterior of the coil units can all be oriented as stacked about a central duct for later required parallel electrical connection.

An advantage of the disclosed winding process is that it is simple. A compact tightly wound coil unit product results.

A further object to this invention is to disclose a process for the construction of successive ring shaped laminates for stacking about and thereafter fastening to the central duct of a submerged electromagnetic sodium pump for the conduction of magnetic fields generated at the coil units. According to this aspect, a mandrel is again used. Individual laminates in 12 groups of 100 each are bound together with stiff outside members compressing thin inside laminates therebetween under bolt tension acting through elongate slots. The laminates define coil receiving depressions. The individual laminates of each laminate group are registered to a cylindrical mandrel having the general dimensions of the central duct. Consequently, the individual laminates move relative to one another so as to dispose their inner ends at the cylindrical mandrel in an arch segment. Individual laminate groups are registered at their inner radial ends to the mandrel so as to form together a continuous arch around the central mandrel. Typically, 12 such 30° groups are placed around the mandrel so as to form an endless circular arch. Temporary radial bracing is used to position the laminate groups to the mandrel. Thereafter, the exterior of the laminates is wound with molybdenum wire so that the ends of the laminates are radially compressed inward. Welding of the outside laminate elements of each group at their points of joinder occurs to form a rigid ring-like laminate assembly. Once fabricated, the ring like laminate assembly for a layer of the pump is lifted free as a discrete element.

An advantage of the ring like laminate layer construction here utilized is that a single layer of laminates usable as a discrete magnetic field conductive layer in the pump results. Two such laminate layers are utilized to trap therebetween a coil unit. Accordingly, the laminate layers alternately stacked with the coil units lend themselves to the stacked sandwich construction of the outer stator encircling the central stator duct or of the disclosed submerged liquid sodium pump.

An advantage of the laminate members bound by the molybdenum wire is that they can use interfering thermal expansion for keying rigidly to the central duct of the stator of the submerged pump. This rigid keying to the central duct of the pump has two discrete advantages.

First, the inevitable resistance heating of the coil units can be conducted by the laminates away from the coils to and through the duct into the pumped sodium of the cold leg of the sodium cycle. Thus, the coil units are maintained at a sufficiently cool operating temperature (about 1,000° F.) to ensure a long operating life. Further, the heat from such coils is communicated to the liquid sodium where it may be at least partially recovered as output plant energy (subject to thermodynamics limitations).

Yet another advantage of the laminate construction is that it keys to the central duct by virtue of the interfering thermal expansion. This keying takes place with sufficient force to prevent relative movement of the laminate construction with respect to the central duct of the stator. It will be understood that in the pumping of the liquid sodium inevitable current induced magnetically reactive forces caused by the operation of the pump occur. Specifically, the magnetic reactive force from the pumping of the sodium is transferred to the laminates by the pumping magnetic field. The laminates, because of their rigid key to the central duct, withstand this force without relative movement of the laminates at the central duct or coil units. Accordingly, a pump construction is disclosed in which a long wear resistant operation of the pump can occur.

A further object to this invention is to disclose the construction of the central magnetic field conducting core. According to this aspect of the invention laminates grouped together in preferable 10° pie shaped segments are provided with common and overlying dove tailed wedge receiving apertures. Groups of pie shaped laminate segments are pulled to an inside pipe member by a sliding wedge fitting. The sliding wedge fitting includes a first dovetailed wedge keyed to the complementary dovetail apertures in the laminates, a second member keyed to the inside of a central pipe and a threaded bolt therebetween. The threaded bolt causes the dove tail aperture to climb a ramp which shortens the interval between the pipe and dovetailed laminates to pull the pie-shaped laminate sections into rigid and firm side-by-side continuous contact around the central pie-shaped. By the expedient of utilizing 36 such sections pie-shaped sections of 10° each, a rigid and unitary radially laminated iron member for defining the inside magnetic core conducting path of the pump results. This core is subsequently surrounded by banded sheet and seam welded with resultant shrinkage at the seam producing a liquid sodium tight cover over the exterior of the central core member.

An additional object to this invention is to disclose a process for fabricating the stator of the submersible pump. Accordingly, the outer pump stator construction begins by placement of the central duct. Thereafter, laminate rings and coil rings are alternately stacked the entire length of the pump. Once the laminate ring and coil units are suitably stacked, upper and lower compression rings drawn together by vertically extending tension bolts. These upper and lower compression rings when drawn together permanently compressing the laminate rings and coil units therebetween. The exterior of the stator of the submersible pump is thereafter wound in a cover metal sheath and seam welded to provide in combination with the central duct a continuous sodium barrier around the stator. The interior core of the pump is then installed and suitably braced with respect to the stator. The completed pump thereafter defines between the outer stator and the central core a cylindrical interstitial volume between the bottom pump inlet and the top pump outlet for the pumping of the sodium.

An advantage of the disclosed pump construction is that the laminate rings freely fit over the central duct of the stator during pump construction. Only when the pump is heated upon exposure to liquid sodium do the laminate rings key to the central duct by interfering thermal expansion. When such keying does finally occur, the rigid and unitary required interconnection of the laminate rings to the central duct occurs.

A further advantage of this invention is that so long as the pump is exposed to the temperature of the sodium, this rigid connection remains. Consequently, operation of the disclosed pump is desired in an ambient that remains continuously heated over the life of the pump.

An advantage of the resulting pump construction is that a long life pump results. This pump, without moving parts or auxiliary gas cooling systems, relies only upon electromotive coupling of the conveyed magnetic field.

An additional advantage of this pump is that the stator can be powered by coils connected in parallel. These coils reduce the overall voltage required for driving the pump. A pump driven by a thee phase voltage source in the range of 700 volts at 15 Hertz is disclosed.

BRIEF DESCRIPTION OF THE DRAWINGS

Other objects, features and advantages of this invention will become more apparent after referring to the following specification and attached drawings in which:

FIG. 1A is a side elevation section of a prior art sodium cooled reactor illustrating the sodium flow loop during normal reactor operation and illustrating the location of the sodium pump of this invention within the so-called "cold leg" of the sodium loop;

FIG. 1B is a plan view of the reactor of FIG. 1A taken along lines 1B—B of FIG. 1A to show the placement of four pumps according to this disclosure within a single sodium cooled reactor;

FIG. 2A is an initial view of the winding of the coil unit of this invention illustrating the discrete bus strips of the three elements of the lower spiral wind being tensioned along a tension path with a system of pulleys and weights and illustrating the clockwise rotation of the mandrel to produced a three coil element spiral wind in a first direction, the second half of the coil elements not being wound randomly coiled in storage on top of the mandrel;

FIG. 2B is a view of the mandrel similar to FIG. 2A with the lower portion of the coil wound, a layer of insulation interposed and the upper portion of the coil being wound with respect to the mandrel, it being understood that a pulley system identical to that shown with respect to FIG. 2A is utilized but not shown;

FIG. 2C is the completed coil unit of FIG. 2B, the coil here shown having temporary ties for maintaining the coil as a unit;

FIG. 2D is the finish coil unit, the coil unit here being held as wound together by winds of insulation;

FIG. 3A is an illustration of an individual laminate for forming the laminate rings of this invention;

FIG. 3B illustrates the bolting together of a group of laminates at an elongate slot for placement in the ring construction;

FIG. 3C illustrates 12 groups of laminates being confronted to a mandrel (schematically shown in broken lines) with a molybdenum wire hoop tensioning the laminates to form an endless arch to produce a laminate ring construction;

FIG. 4A is a detail of the central core laminates utilized with this invention;

FIG. 4B illustrates the central core being wrapped in a sheath and seam welded to form a liquid tight sodium construction: and, FIG. 4C is an expanded view of a clamp shown in perspective for keying the central core with its laminate construction to a central pipe to form a unitary cylindrical magnetic field conducting member;

FIG. 4D is a side elevation section at the top of the pump central core illustrating the construction of the central core member;

FIG. 5 is a side elevation section of the pump having 96 coil units sandwiched between 97 laminate ring constructions, the coil units being connected for defining from a 15 Hertz 700 volt power supply a serially upwardly conveyed group of magnetic fields for entraining sodium from the bottom inlet of the pump to the top outlet of the pump for pumping.

SUMMARY OF THE PRIOR ART

Referring to FIG. 1A. a liquid sodium reactor is shown enclosed within a containment vessel C and a reactor vessel V. As is common in the art, containment vessel C is closely spaced to the reactor vessel V and is capable of containing liquid sodium S in the case of a rupture of the reactor vessel V.

The components of the reactor and the placement of the pumps can best be understood by tracing the sodium coolant flow path and at the time describing the component parts.

Continuing with FIG. 1A and remembering that the reactor is undergoing normal power operation, core 12 heats passing sodium S and discharges the heated sodium S into a hot pool 14. Hot pool 14 is confined interior of the reactor by a vessel liner L. Vessel liner L only extends partially the full height of the reactor V terminating short of the top of the reactor vessel V at 16. This termination is part of a cool down feature of the reactor which is not important to this invention and consequently will not be further discussed.

Sodium from hot pool 14 enters into intermediate heat exchanger H and dissipates heat. Heat is dissipates through a secondary sodium circuit schematically labeled 18 which passes typically to a steam generating heat exchanger and back into the reactor. Conventional power generation utilizing the secondary sodium loop and generated steam will not be set forth.

After heat exchange and flow induced pressure drop across the heat exchanger H, the liquid sodium passes to a cold pool 20. Cold pool 20 is at a lower hydrostatic pressure than hot pool 14 because the pressure drop through the heat exchanger H. Cold pool 20 outflows through fixed shield cylinders 22 to the inlet 24 of main reactor pumps P. These reactor pumps are the pumping devices set forth in the disclosure herein.

Typically, rector pumps P are of the electromagnetic variety. These pumps P have a low pressure bottom inlet 24 and a high pressure upper outlet 26. Sodium outlet through high pressure outlet 26 passes through pump discharge 28 to the inlet of core 12. This completes the sodium circuit.

The reactor cold pool is maintained at a slightly lower pressure (about 4 psi) from the reactor hot pool during normal operation. The temperature of the reactor cold pool is in the order of 600° F.

The necessary control rods enter from, and are withdrawn to, a control rod plenum 30. Since the control rods do constitute a part of this invention, they will not herein further be discussed.

The reader will also understand that FIG. 1A and its accompanying section in FIG. 1B are an oversimplification of the sodium cooled reactor. In actual practice, the reactor includes two kidney shaped sectioned heat exchangers H and four pumps P (see FIG. 1B). Disposition of the pumps P and heat exchangers H can be understood upon studying of FIG. 1B.

It will be further understood that the section of FIG. 1A is for purposes of understanding. It will be understood that it is desirable to pump sodium in the secondary loop as well. This secondary loop is into and out of the intermediate heat exchanger H by piping not shown. Again, on the cold leg of such piping, a submerged sodium pump or pumps P similar to the construction herein can be utilized.

Having set forth the environment of the sodium cooled reactor and the placement of four pumps of this invention therein, attention can now be turned to the construction of the pump.

First, and with respect to FIGS. 2A-2D, the construction of an individual coil unit will be illustrated.

Thereafter, and with respect to FIGS. 3A-3C. the construction of the ring laminate will be set forth.

Then, and with respect to the details of FIG. 4A. and the clamp illustrated in FIG. 4B, the clamping action illustrated in FIG. 4C and the final construction of FIG. 4D. the construction of the inner core element of the pump will be set forth.

Finally, and with respect to FIG. 5, the total construction of the pump will be illustrated.

Thereafter, and with a brief return to the illustration of FIG. 3C. the thermal interference fit of the ring elements to the central duct of the stator will be discussed.

Referring to FIG. 2A, a mandrel M is shown having a central arbor 40. Arbor 40 supports thereon a gathering surface 42 of the mandrel and a loose coil wind of strips B1, B2, and B3. As has been described. strips B1, B2, and B3 are each as long as the individual coil elements that they eventually become. The strips are flat. They are on the order of $\frac{1}{8}$ inches thick and made of copper.

The strips are on the order of $\frac{3}{8}$ inch wide. They thus define elongate bendable and conductive strips.

Preferably, and before being wound into the coils of this construction, the strips B1, B2 and B3 are covered with layers of wrapped spirally wound insulation 44. This insulation 44 is relatively light and serves to isolate the adjacent coil segments one from another.

The strips are fastened at their S-shaped curves to the mandrel. Strip B1 fastens at S-shaped curve 51 to the mandrel. Similarly, strip B2 fastens at S-shaped curve 52. Strip B3 fastens at S-shape curve 53.

It can be seen that one end of each S-shaped curve 51. 52. 53 defines the beginning of the lower spiral half of each coil element. Similarly, the other and upper end of each S-shaped curve defines the beginning of the upper spiral element of each coil.

In the illustration of FIG. 2 it will be understood that the S-shaped curves 51, 52, and 53 are precisely in the middle of the respective strips B1, B2, and B3. This being the case, it is necessary to store on top of the mandrel in a loosely bound coil 60 half of each of the strips B1, B2, and B3. These strips are coiled in random fashion much like a randomly coiled rope and temporarily held in place to rotate with the mandrel M as the lower coil half 62 is wound.

It is necessary to tension the respective strips B1, B2, and B3. Therefore, the strips extend down and elongate tension path 68. The strips B1, B2, and B3 slowly rotated 90° over these respective tension paths and pass over the surfaces of the respective pulleys 71, 72 and 73. Thereafter, the strips B1, B2 and B3 pass over respective upper pulleys 74, 75, 76 and then pass downwardly to clamps 77, 78 and 79. At the respective clamps, cables 81, 82, and 83 connective the respective ends of the strips B1 to weight W1, B2 to weight W2 and strip B3 to weight W3.

Once the system of weights and strips is set forth, tension winding can be easily understood.

Specifically, mandrel M rotates in the clockwise direction. As it rotates, plate 42 captures the edges of the strips B1, B2 and B3 sequentially in a wind over the mandrel M. The full length of the respective strips is wound and temporarily braced in placed. Once winding and temporary bracing occurs. winding of the lower coiled half with its three conductive strips B1, B2 and B3 is completed.

Referring to FIG. 2B. the winding of the top half of the coil is illustrated using the same mandrel M. Specifically, a layer of insulation I is placed over the previously wound lower coil half. This layer of insulation I serves to prevent distal ends of the respective coils from arcing and thus defeating the generation of the required magnetic fields.

Thereafter, mandrel M is extended at an upper fitting 41 and gathering plate 42 moved upwardly. Gathering plate 42 is moved upward a distance so as to capture the second half of the spiral winds of strips B1, B2, and B3 in a wind that is similar, but not identical to the wind previously produced at lower half 62.

Upper half of the coil 64 is wound like lower half 62 in a spiral. It is, however, a spiral generated by a counterclockwise rotation of the mandrel M. Such rotation occurs until the ends of the respective strips B1, B2 and B3 are reached. The respective ends are then blocked (preferably at 120° intervals) and a construction similar to that shown in FIG. 2C results.

Referring to FIG. 2C, temporary fastening bands 96 have been placed at intervals around the periphery of the coil unit U. Coil unit U includes a lower wind 62 and an upper wind 64.

Each of the strip ends can be seen. For example, strip B1 has respective ends 91, 101. Strip B2 has respective ends 92, 102. Further, strip B3 has respective ends 93, 103.

It can be seen that the lower ends of each coil element protrude from the lower layer. Thus. layer 62 of the coil unit U includes first end 91 of strip B1, first end 92 of strip B2 and first end 93 of strip B3. Likewise, the upper coil layer 64 includes second end 101 of strip B1, second end 102 of strip B2 and second end 103 of strip B3.

All that remains is to bind the coil members together. Specifically, the ties 96 are removed and in their place there is fastened insulation layer 105. Insulation layer 105 is spirally wound around the coil. During such spiral winding, the temporary ties 90 are removed.

It can be seen that in FIG. 2D. the final product is present. Specifically, the coil unit U with its respective ends 91, 92, 93 from spiral wind 62 and ends 101, 102, 103 from spiral wind 64.

It further can be seen and understood that all required electrical connections occurred to and from the outside of the coil construction. That is by having the two coils with a transition on the inside. the distal ends of the strips are all to the outside of the coil unit.

The reader can also understand that in accordance with Lenz's law, each half of the coil construction will generate complementary (and not opposing) magnetic fields. That is to say, utilizing the "left-hand law" (applicable to motors) both coil half 62 and 64 will effect electron rotation in the same direction about the coil, assuming that the same voltage potential is placed in parallel across connections 91, 101; 92, 102; and 93, 103.

Having set forth the construction of the coil units U, attention can now be devoted to the construction of the ring laminates L.

Referring to FIG. 3A. laminate element 120 is illustrated. The laminate element defines a central edge 122. As will be hereinafter more fully explained, edge 122 abuts the central duct member C of the stator. It is this edge 122 which conducts heat to the central duct member D. Additionally, edge 122 rigidly fastens to the central duct member D and thus enables the secure construction of the stator T.

The individual laminate members also define coil receiving indentations 123, 124 at their side edges. These indentations receive upper and lower coil units U therein as will be hereinafter explained.

The laminate unit also includes an end aperture 126. End aperture 126 defines an interval to which a molybdenum wire is eventually radially wound. The radially wound molybdenum wire enables the construction illustrated in FIG. 3C to be maintained as a unitary mass.

This strip further includes an elongate aperture 128. The elongate aperture 128 is utilized to thread a bolt 130 (see FIG. 3B). Typically with a bolt 130 a group of about one hundred laminates 131 can be bolted together.

It is preferred that the outside laminate 132 exceed the thickness of the inside laminates 131. This enables bolts 130 to be more effective in maintaining the side-by-side relationship.

As can be seen, a group of laminates G held together by a bolt 130 constructed as set forth in FIG. 3B are ready to form an element of the final unitary laminate ring construction shown in FIG. 3C.

Referring to FIG. 3C. each of the individual group of laminates G are confronted to a mandrel 140 (shown only schematically in broken lines). Bolt 130 is given a tension so as to permit relative movement between the laminate members 131 and the two edge members 132 on either side. The laminates together at their abutting surfaces 122 to the mandrel 140 form a segment of an arch. As can be seen in FIG. 3, the end elements 122 of group G1 form arch segment A1. Likewise, the end elements 122 of group G2 form arch segment A2. This process repeats until the end edges 122 of group G12 form the arch segment A12.

It can be seen that the arch segments A1 through A12 form continuously around the mandrel 140 an endless arch. This endless arch is the inner ring construction used in the laminate construction L illustrated in FIG. 3C.

When this abutment has occurred, the grooves 126 of each group G are wound with a molybdenum wire 150. Molybdenum wire 150 applies a hoop tension to that part of each one of the laminates of groups G1–G12. This hoop tension urges each of the individual laminates 120 to and towards mandrel 140. In such urging, the hoop tension of wire 150 exerts a radial tension on each of the laminate members 120. These laminate members in turn all form an arch member at their ends 122. A unitary construction results.

Typically, it is desired to weld at the intersection of the individual groups G a wedge, the purpose of this wedge being to securely brace the ring laminate construction. Accordingly, a welded wedge 152 is shown between the elements forming group G8 and group G9. Similar welded wedges extend entirely around the ring laminate construction.

It will be understood that mandrel 140 includes a table surface 141, which table surface is only partially shown. When construction is complete, laminate ring L may be lifted free of the table surface 141. As such it remains ready for the construction of the final pump illustrated FIG. 5.

Having set forth the construction of the ring laminate L, attention can now be devoted to the central core K of the sodium cooled reactor.

Construction of the central core member K of the invention can best be understood by first referring to FIGS. 4A, 4B, and 4C. Thereafter, and with respect to FIG. 4D, its overall placement to the center of the stator T can be understood.

Referring to FIG. 4A. four laminates 201, 202, 203, and 204 are shown. Specifically, a group of laminates 201 form a first portion of an overall wedge construction 210. A second group of side-by-side laminates 202 form a second and adjacent part of the wedge construction 210. A third group of laminates 203 form a thinner section of the wedge and finally laminates 204 form the final portion of the wedge.

Each of the laminates defines therein a dovetail connection 220. Dovetail connection fits and is threaded by a circular dovetail 230 from a wedge fitting 240. Wedge fitting 240 is shown in FIG. 4C.

It is preferred that the wedge segments each occupy approximately 10°. The wedge segments are placed to dovetail fittings 240 with three such pie-shaped segments being placed in side-by-side relation. Such a grouping of pie-shaped segments is set forth in FIG. 4B at 211. 212. 213 and occupies a 30° segment.

A central pipe 235 is provided. Pipe 235 includes an aperture 236 in its wall. When a group of side-by-side laminates such as group 210 are threaded with a wedge shaped end rim 230 on a fitting 240, a lug 242 is placed through aperture 236 in pipe 235.

Thereafter, a ramp fitting 238 and a bolt 239 are placed through an aperture 241 at the end of lug 242. By the tightening of bolt 239, a wedge action between ramp 238 and aperture 241 results. An inward pulling of the pie-shaped segments 211, 212. 213 to and towards pipe 235 results upon tightening of the bolt.

By utilizing the fittings 240 to form a continuum of segments such as segments 211, 212, and 213 around a central pipe 235, the resulting cylindrical laminate construction can be understood. Moreover, by tightening the fittings 240 to draw the wedge shaped groups 210 inwardly to and towards the pipe 235, a construction having a cylindrical laminate results.

Referring to FIG. 4B. it will be understood that once pipe 235 is continually ringed with laminate groups, such as groups 211, 212, and 213, it is necessary that the central core member K be covered with a metal membrane. Typically, a layer of metal 250 is first banded and thereafter welded at a seam 251 around the cylindrical member. In such seam welding, shrinking results. Therefore, the laminate member will be understood to be surrounded by a continuous membrane 250. This membrane will be impervious to the liquid sodium so that the sodium cannot penetrate the interstitial areas between the individual laminate members making up the central construction of the core K.

It will also be understood that the clamp members K utilized will be drawn tight. Such tight drawing will assure that the laminates do not move relative to either the surrounding membrane M or the pipe 235. As in the case of the ring laminate construction L, the reactive forces of the pumping magnetic fields could cause relative movement and premature pump wear.

Referring to FIG. 4D. the final construction of an element K at one end only is illustrated. Specifically, the central pipe 235 is illustrated. Groups of laminates 210 are shown held to the pipe by the fittings 240. The reader will understand that multiple fittings 240 are use throughout the length of the pipe 235.

Further, the laminate groups will be in discrete lengths. All the overall length of the central core K may be 15 feet, the laminates themselves may be in side-by-side groups in the order of 2 feet long. By placing the groups end to end, the required length of central conductive core is produced.

Having set forth the construction of the central core, attention may now be directed to the overall assembly of the pump. Such an assembly can now be easily understood with respect to FIG. 5.

Referring to FIG. 5, the overall pump P is illustrated. Pump P has the central core member K placed in the center thereof. The reader will remember that this core member K is cylindrical and threaded concentrically to the central duct member D of the pump. Presuming that duct member D is in place, alternating stacking of coil units U and laminate springs L will occur. A first laminate ring L will be placed at the bottom of the pump. Thereafter, alternating coil units U and laminate L will be stacked. This stacking will occur the entire length of the pump. Specifically, 96 coil units U will be stacked between 97 laminate constructions L.

Wiring of the coil units U is not a part of the disclosure herein.

It will suffice to say there will be eight groups of 12 coil units U generating 12 successive magnetic fields from the pump inlet 24 at the bottom to the pump outlet 26 at the top. These conveyed magnetic fields will convey successively upward in an endless succession. It is this endless succession which at the interstitial volume between core K and the inside of duct D produces the conveying and motoring magnetic field.

Returning to FIG. 5, it will be appreciated that the entire length of the pump between an upper compression ring 300 and a lower compression ring 302 is compressively held together about outer duct D. That is to say, the respective laminates L trap the coil units U therebetween to firmly hold the coil units U in place.

Further, the thickness of the laminates L defines a small gap between the individual laminate L. This small gap ensures thermal conduction and maintains the coil units U rigidly braced therebetween.

Having set forth the construction of the overall pump, attention can now be directed to the thermal expansion interference fit of the laminates L to the central duct B. This understanding may best be set forth with respect to FIG. 3C.

Referring to FIG. 3C. the thermal interference fit of the ring laminate construction to the duct D of the stator can be understood (refer briefly to FIG. 5).

Ring laminate construction is originally dimensioned to fit snugly over the duct with a small clearance —on the order of 0.0001 inch. This fit occurs in the cold state of the pump.

It will be remembered that the so-called "cold leg" is at an elevated temperature in the range of 600° F. Expansion of the central duct and laminates 120 therefore occurs.

This expansion is limited by the hoop tension in the wound molybdenum wire. Simply stated the groups of laminates G key rigidly to the central duct member.

Two advantages flow from this construction. First, the resistance heating of the coil units J is conducted away from the coils. The conduction path includes the coil receiving apertures 123 or 124 to the abutted edges 122 and through the duct D to the "cold leg" of the liquid sodium. Operating temperature in the range of 1000° F. can be maintained.

Second, the rigid keying prevents reactive movement of the laminate ring construction L with respect to the central duct D. This prevents relative movement of the component parts of the pump and ensures a long pump life with the absence of mechanical wear.

What is claimed is:

1. A pump construction for liquid sodium including a plurality of circular and discrete coil elements for being placed around a central and cylindrical central duct, a plurality of ring laminate constructions for placement to said central cylindrical duct, said plurality of ring laminate constructions for trapping and firmly engaging therebetween said coil elements, said laminate constructions comprising:
   a plurality of groups of laminates arrayed side-by-side, each laminate for extending in a plane parallel to the axis of said cylindrical duct, said laminates formed from a material for conducting a magnetic field;
   each group of laminates abutted to the central duct to form an arch about a segment of said central duct;
   said plurality of groups of laminates each having at least one laminate parallel to a radius of said central cylindrical duct and being abutted to said central cylindrical duct to form an endless arch adjacent said central cylindrical duct completely surrounding said duct;
   said groups of laminates each defining coil element receiving grooves for receiving and firmly clamping therebetween said coil elements of said pump;
   means for binding said laminates radially to and towards said central duct to maintain said group of laminates as an endless arch whereby said laminate construction can be manipulated as a unitary construction with respect to said central duct; and
   means for compressing said ring laminates construction together along the length of said duct for trapping said coil elements therebetween.

2. The invention of claim 1 and wherein:
   each of said radial laminates of said group of laminates is formed of a first material having a thermal index of expansion to expand and compress at said central arch and key to said central duct upon heating; and means for binding said laminates radially to and toward said central duct, said radial binding means providing radial tension to said laminates whereby expansion of said laminates to permit said expanding laminates to rigidly key to said central duct.

3. A submersible sodium pump for pumping liquid sodium, said pump comprising in combination:
   a central duct for permitting a cylindrical stator member to be formed thereon;
   a plurality of coil members having discrete spiral wound coil configurations for surrounding said central duct;
   a plurality of ring laminate constructions formed about said central duct, two adjacent ring laminate constructions trapping one of said coil segments therebetween;
   said ring laminate constructions for placement to said central cylindrical duct each including a plurality of groups of laminates arranged side-by-side for extending in a plane parallel to the axis of said cylindrical duct;
   each group of ring laminates constructions abutted in an arch to and towards the central duct of said palm to form an arch about the segment of said central duct;
   said plurality of groups of ring laminate constructions each having at least one laminate parallel to a radius of the axis of said central cylindrical duct and being abutted to said central cylindrical duct to form an endless arch adjacent said central cylindrical duct completely surrounding said duct;
   said plurality of groups of ring laminate constructions further defining top and bottom coil member receiving indentations for receiving and trapping said coil segments on either side of said ring laminate constructions;
   means for binding said laminates radially to and towards a central duct to maintain said group of laminates as an endless arch whereby said ring laminate constructions can be maintained as a unitary construction with respect to said central cylindrical duct;
   means for compressing said ring laminate constructions one towards another whereby said coil elements are firmly held between respective ring laminate constructions; and
   central magnetic conductive iron placed interiorly of said central duct whereby helical magnetic fields are conveyed from the bottom of said duct to and towards the top of said duct.

4. The invention of claim 3 and wherein said laminates of each said ring expand upon heating, said laminates in expansion upon heating confined by hoop tension to impress upon said central duct and key rigidly to said central duct to conduct heat from said coil to said central duct.

5. The invention of claims 1 or 3 and wherein said coil constructions include;

at least one elongate bus member said bus member having a flattened major planar surface with two spaced apart side edges defining a constant width strip along the length of said bus, said bus member fabricated from a flat bendable conductive material;

an insulation layer wrapping said bus member;

a central bend made within the major plane of said bus member for defining transition between a lower spiral wind and an upper spiral wind to form upper and lower spiral halves of said coil;

said lower coil spiralled outward from said central bend in a first rotational direction from said central bend to one of the edges of said coil to dispose half the length of said bus in a spiral wind with the flat major surfaces of successive winds confronted one upon another in continuously outwardly spiral layers terminating at one of the ends of said elongate bus;

said upper coil wound outward in a second rotational direction from said central bend to one of the ends of said coil to dispose the remaining half of the length of said bus in a spiral wind with the flat major surface of successive winds confronted one upon another in continuously spiraling layers terminating at the other end of said elongate bus, the layers spiraling in the same first rotational direction whereby said upper and lower coil sections when conducting current are series connected at said central bend and form complementary magnetic fields;

means for insulating said upper and lower coil sections to prevent electric arcing between distant portions of said coil; and, means for binding said upper and lower coil sections together to form a unitary member for independent handling.

6. The invention of claim 5 and including three elongate bus members, each said successive bus member wound one upon the other to form three discrete overlying conductive members on said upper and lower coil halves.

7. The coil construction of claim 6 and wherein said three bus members begin and end at equal angular intervals with respect to said coil member.

* * * * *